UNITED STATES PATENT OFFICE.

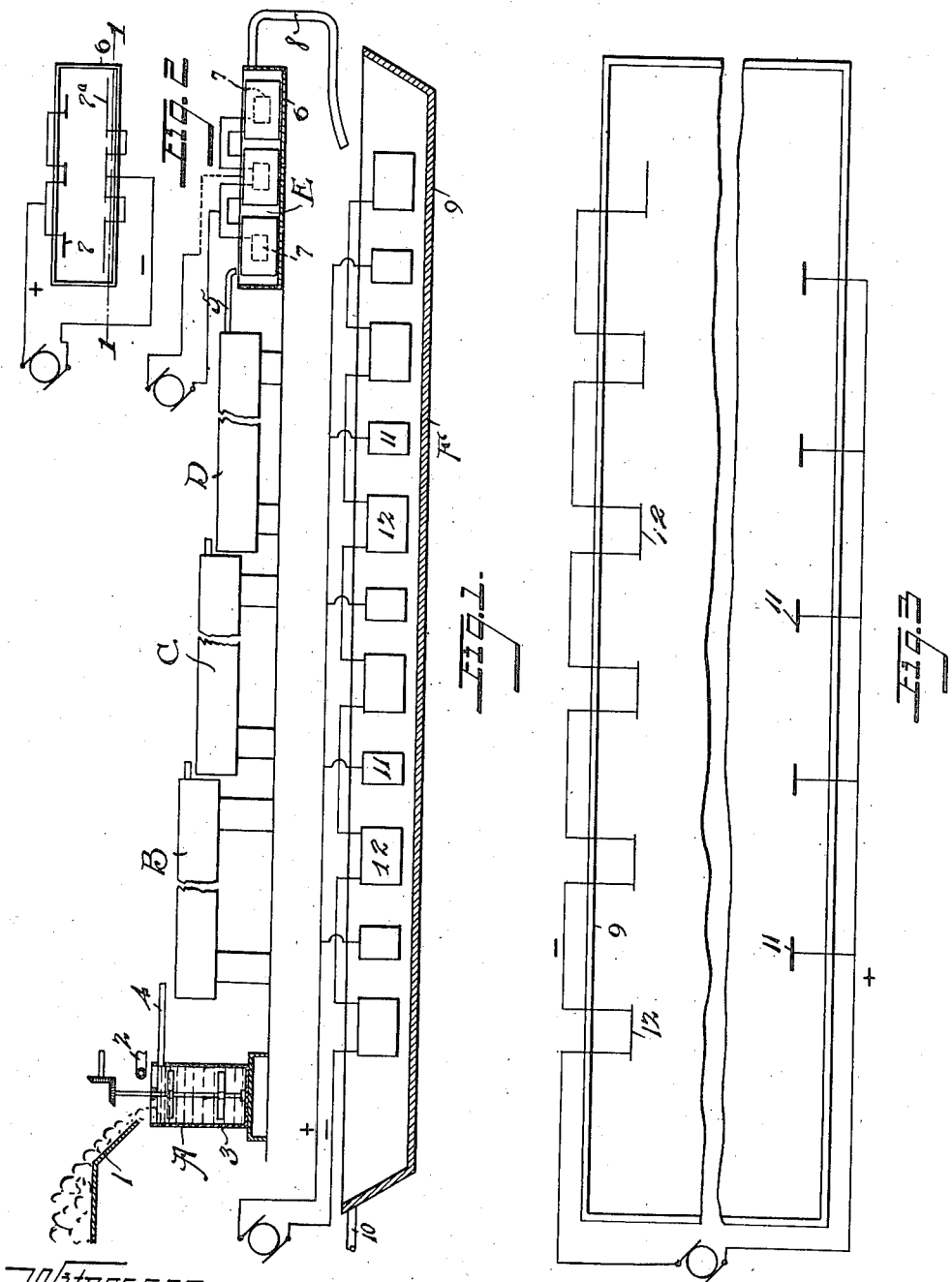

CHARLES C. RUPRECHT, OF BLAKELY, ALABAMA.

METHOD OF SEPARATING AND PURIFYING FULLERS' EARTH AND ANALOGOUS MATERIALS.

1,024,104.

Specification of Letters Patent.

Patented Apr. 23, 1912.

Application filed August 5, 1910. Serial No. 575,829.

*To all whom it may concern:*

Be it known that I, CHARLES C. RUPRECHT, a citizen of the United States, residing at Blakely, in the county of Baldwin and State of Alabama, have invented a certain new and useful Improvement in Methods of Separating and Purifying Fullers' Earth and Analogous Materials, of which the following is a full, clear, and exact description, reference being had to the accompanying drawings.

This invention relates to a method for separating fullers' earth and other materials of like character from a fluid medium and for improving the bleaching and other desirable qualities of such materials.

In many deposits of fullers' earth there is an excess of deleterious material, either in the form of organic matter or of minerals, both of which are undesirable because of their obstructive nature their tendency to decay or because of their abrasive effect. To secure the earth in its best condition and freed from such materials, it is found necessary to wash the earth by mixing it thoroughly with water and allowing the "slip" or mixture of earth and water to pass rather slowly through long tanks or settling vats in which the excess of sand and other deleterious minerals will be quite completely deposited. It is found, however, that when this settling has been carried to a certain extent the earth itself will settle with extreme slowness from the water and remains in suspension for weeks or months. Consequently, the mixture of earth and water remaining after the ordinary washing is very fluid, and the importance of securing the slip in the most dense condition possible to insure rapid recovery, renders it necessary to extract this excess water which, under ordinary conditions, is a very expensive process. Furthermore, the specific gravity of some of the organic contaminations is such that they will not settle out thoroughly, and, under ordinary treatment, the earth is not obtained in a condition suitable for all purposes, such, for instance, as the purification of edible oils.
The object of this invention is a process for rapidly and economically precipitating this suspended earth and simultaneously decomposing and removing the organic contaminations. I have discovered that, if the water carrying the earth in suspension be electrolyzed, the earth is immediately precipitated and the deposit so obtained is so hard that what little remaining water is occluded in its pores may be easily removed by a simple expedient, as by the use of filter presses, centrifugal driers, or evaporation in suitable kilns. At the same time, the organic matter is broken up, either by the direct action of the electric current, or by a secondary chemical reaction with the substances produced by the electrolysis.

In the drawings accompanying and forming a part hereof, an apparatus is illustrated by which my process may be realized.

In these drawings Figure 1 illustrates a sectional elevation of the complete apparatus; Fig. 2 a top view of the electrical treating vat; and Fig. 3 a top view of the settling vat.

Referring more particularly to the drawings by reference characters, A denotes a mixing and scrubbing mill into which raw fullers' earth is fed at a fairly constant rate from a hopper or platform 1 and thoroughly mixed with water, supplied through a pipe 2, by means of revolving paddles 3 or other similar well known means. From this mill the "slip" is conducted by a pipe 4 into a suitable series of sand removing vats B, C and D, preferably arranged in cascade. I have found a convenient dimension of vat to be thirty feet by three feet by three feet, though this is not important; and more or less than three vats may be used, depending upon the amount of sand present. In some cases the vats may be entirely dispensed with. From the last of these vats the sand-free slip is delivered to an electrical treating vat E, as by a conduit 5. This vat consists of an oblong tank 6 having vertical electrodes 7, 7ª, arranged along the walls thereof as shown in Fig. 2. A convenient size of tank is 16 feet by 3 feet by 3 feet and, in the present embodiment, I have shown three anode plates of carbon each of which is preferably 16 inches square, and three copper cathodes each 3 feet wide by 4 feet long spaced 2 feet from the anodes, and arranged so that the slip may flow between them. The rate of flow in this vat is fairly rapid to prevent any great precipitation, and I have found a current of about 150 amperes at 100 to 110 volts to give excellent results. Inasmuch as the conductivity of the usual "slip" is very small, I find it necessary to add a small proportion of some chemical, such as sodium chlorid or sulfuric acid, just before the mixture enters this vat. In either case I usually employ about one pound of the chemical to 2400 pounds of slip, increasing or decreasing this amount through small limits according as I find the mixture operated upon to require a larger or smaller current. When sodium chlorid is used, the effect of the electric current is to evolve free chlorin and form sodium hypochlorite which act upon the earth to give it an added bleaching power and also destroy the organic material. This added bleaching power is apparently due partly to a certain amount of chlorin which is occluded in the pores of the earth and which is retained for an appreciable time, and partly to the fact that when dried the earth is in a more porous condition than would otherwise have been the case. When sulfuric acid is used, the effect of the nascent hydrogen and a certain amount of ozone, which are evolved, is to destroy the organic matter in the same manner. The acid is preferably used in cases where the earth is to be employed for the treatment of certain oils, such as linseed. In general, it may be said that a current density of one-fifth ampere per square inch of positive electrode will be very satisfactory, either for salts or acids.

The use of carbon and copper electrodes is not essential, since other conductors will operate, but will require more frequent renewal. I employ a carbon anode, since carbon is not seriously acted upon by either chlorin or sulfuric trioxid. Copper forms a desirable cathode because of its high conductivity and is not injuriously affected by the chemical reactions in the vicinity of the cathode.

From the vat E the slip is rapidly drawn off to a larger settling vat F by means of a conduit 8. The vat which I employ consists of a tank 9, 80 feet long by 60 feet wide by 5 feet deep. These dimensions are not, of course, compulsory, but the size of the tank should be sufficiently large to cause the movement of the slip to be comparatively slow. From the farther end of this tank a conduit 10 removes the clear water from the upper part of the tank, until the tank is nearly full of almost solid earth. This deposit is periodically removed and dried in any convenient manner at a low temperature (not exceeding 400° Fah.), ground in any of the usual ways, and bolted to the desired mesh.

Electrodes may also be used in the large settling vat, where they have the effect of causing the earth to deposit rapidly and in more dense condition. Where used, I preferably arrange them in rows along the sides, as shown in Fig. 3, the carbon anodes 11 alternating with the copper cathodes 12, electrodes of the same kind being connected in parallel. The number of plates or electrodes is immaterial, though I find a total anode surface of 100 square feet employed in connection with a total cathode surface of 150 square feet, with current at a potential of 100 to 110 volts gives good results. Sufficient chemicals will ordinarily be retained in the liquid from the previous treatment to impart the necessary conductivity.

While I have described the above process especially in connection with the separation and refining of fullers' earth, I am aware that it may profitably be employed in refining and bleaching other materials, such for instance as kaolin, or for precipitating finely divided graphite, talc, gypsum, or the like, from suspension in an organic solution.

Having thus described my invention, what I claim is:

1. The process for separating fullers' earth from organic impurities consisting in mixing the earth with water, rendering the water electrically conductive, and then submitting the water to electrolytic action, whereby the organic impurities are destroyed and the earth precipitated.

2. A process for purifying and separating fullers' earth consisting in mixing the earth with water, decanting the mixture from sand and like impurities in suitable tanks, adding chemicals to render the liquid conductive, and electrolyzing the solution so formed.

3. An apparatus for separating and purifying fullers' earth comprising a device for mixing the earth with water, means for removing the sand by gravity, and means for electrolyzing the mixture of earth and water.

4. An apparatus for separating and purifying fullers' earth comprising a device for mixing earth with water, means for removing the sand by gravity, means for electrolyzing the mixture of earth and water, and means for decanting the water from the deposited earth.

5. A process for recovering fullers' earth from its suspension in water consisting in causing the earth and water to pass rapidly through an electrolytic cell, and afterward decanting the water and drying the deposited earth.

6. The process of separating and purifying fullers' earth consisting in mixing the earth with water, impregnating the mixture of earth and water with a chemical adapted to render the water conductive, passing the mixture through an electrolytic cell, and causing the mixture to be thereafter retained in a larger tank or vat while precipitation of the earth takes place, and then decanting the clear water.

7. The process of separating fullers' earth from impurities consisting in mixing the earth with water, rendering the water conductive by the addition of a suitable chemical, causing the mixture to flow through an electrolytic cell, causing a current of electricity to pass through the mixture across its direction of flow, and thereafter conducting the mixture to a settling tank, and then subjecting the mixture to electrolytic action.

8. The process of separating fullers' earth from impurities and precipitating such earth which consists in mixing the earth with water, rendering the water conductive by the addition of a suitable chemical, causing the mixture to flow rapidly through an electrolytic cell, subjecting the flowing mixture to a current of electricity passing therethrough in a direction transverse to the flow, conducting the mixture to a settling tank wherein it flows slowly through said tank and there subjecting the mixture to electrolytic action during its transit through such tank.

9. The process of precipitating finely divided mineral matter from its suspension in a solution containing organic matter consisting in adding suitable chemicals to the solution to render it electrically conducting, and electrolyzing the solution so formed.

10. The process of bleaching finely divided mineral matter consisting in mixing said matter with water, adding chemicals to the mixture, said chemicals being of a nature to render the mixture conducting and adapted to be decomposed by an electric current into substances having a bleaching effect, and passing an electric current through the solution so formed.

11. The process of enhancing the bleaching effect of fullers' earth consisting in mixing the earth with water, adding suitable chemicals to the mixture so as to render the mixture conducting, said chemicals being adapted to be decomposed by electrolysis into substances having a bleaching effect, and electrolyzing the solution so formed.

In testimony whereof, I hereunto affix my signature in the presence of two witnesses.

CHARLES C. RUPRECHT.

Witnesses:
J. E. ANDERSON,
D. C ANDERSON.